ns Sept. 14, 1954

UNITED STATES PATENT OFFICE 2,689,201

LINDANE AND TRI-ALKYL PHOSPHATE INSECTICIDE

James W. Hansen, Berkeley, Calif., assignor to California Spray-Chemical Corporation, Richmond, Calif., a corporation of Delaware No Drawing. Application November 15, 1951, Serial No. 256,607

4 Claims. (Cl. 167—22)

This invention relates to insecticidal compositions and particularly to such compositions containing as an active toxic component the combination of the gamma isomer of hexachlorocyclohexane and a trialiphatic ester of orthophosphoric acid.

It has previously been recognized that hexachlorocyclohexane or the commonly designated benzene hexachloride (BHC) exists as a mixture of isomers and possesses exceptional insecticidal properties. Of the various isomers, the gamma isomer has been established as accounting for the predominant toxicant properties of the mixture. This toxic isomer is present in the isomeric mixture in varying amounts from about 6 to above 20% by weight, depending upon the method of preparation. Aside from its presence in benzene hexachloride or BHC, the gamma isomer has been extracted and separated as a substantially pure product and designated as Lindane. Lindane contains at least 99.5% of the gamma isomer of hexachlorocyclohexane by definition.

According to the present invention, it has been discovered that a class of compounds which, in and of themselves, possess negligible toxicant properties, will unexpectedly improve the insecticidal value of the gamma isomer of hexachlorocyclohexane when applied in combination therewith as an active toxic component in insecticidal compositions. Thus, it has been found that the trialiphatic esters of phosphoric acid and particularly the trialkyl or tri(chloroalkyl) phosphates unexpectedly enhance the toxicant properties of the gamma isomer of hexachlorocyclohexane or Lindane and provides a synergistic combination which allows the achievement or results substantially superior to those obtainable when either of the constituents are used separately. This synergistic toxicant combination may be formulated and applied in any of the conventional manners associated with the formulation and application of the gamma isomer of hexachlorocyclohexane. The toxicant combination may be formulated in conjunction with a liquid or solid carrier, or may be further combined with other toxic components to provide a combination insecticidal composition for multiple applications.

The pronounced advantage of the toxicant combination is particularly noticeable in its application as a fly control medium. It has become recognized in certain geographical areas and where the conditions are conducive to fly propagation that rapid fly evolution has developed a strain which is particularly resistant to conventional insecticidal control. In such areas, effective control requires greatly increased dosage of insecticide and constant application, and many dairy farmers have abandoned fly control in their barns as either impractical or impossible. However, by means of the subject toxicant combination, it is now possible to obtain effective fly control with a reduced concentration of the gamma isomer of hexachlorocyclohexane, even against resistant flies. Additionally, such control is effective over a greater length of time, due to the increased residual effect of the insecticide.

The synergist of the invention falls within the class of trialiphatic esters of phosphoric acid. These compounds possess negligible toxicant properties per se and are solely effective in combination with lindane or compositions containing the gamma isomer of hexachlorocyclohexane. For purposes of the present invention, the greatest synergism is obtained with the trialkyl and tri(chloroalkyl) phosphates and particularly those containing from 1 to 3 carbon atoms in the alkyl group. Representative of the preferred class of compounds are trimethyl phosphate, triethyl phosphate, tripropyl phosphate, tri(chloroethyl) phosphate, tri(chloromethyl) phosphate, tri(chloroisopropyl) phosphate, etc.

The amount of each component in the toxicant combination does not appear to be critical and synergism may be obtained in widely varying ratios of each component. For maximum utilization of the synergistic effect of the phosphate component, it is desirable to employ a combination in which the ratio of the concentration of the phosphate ester to the concentration of the gamma isomer of hexachlorocyclohexane is at least 1. Improved results occur as the ratio is increased and is still evident at ratios as high as 10 and 20. Excellent field results in certain areas have been obtained with a 2½ ratio.

As previously stated, the toxicant combination may be formulated and applied in any manner conventional to the use of insecticidal compositions containing lindane or the gamma isomer of hexachlorocyclohexane as an active toxic ingredient. One appreciable difference in this regard is the permissible reduction in gamma isomer dosage for equivalent or even greater toxicant effect. The toxicant combination may be either formulated together in a suitable concentrate or they may be separately formulated for subsequent joint application. Further, the synergist combination may be formulated for direct application to the organism or insect to be controlled such as in the form of aerosols, liquid sprays, and dusting compositions, or in a form suitable for indirect application such as fumigation or heat-induced vaporization in an enclosed area.

One of the advantages of lindane as an insecticide is its comparatively low vapor pressure which may be utilized for prolonged insect control in enclosed areas by heat-induced vaporization. Thus, the lindane may be contained in a receptacle to which heat is supplied in a controlled fashion such as by resistance wiring or may be coated on a heated surface such as an electric light bulb. The toxicant combination of the invention may be applied in a similar manner, although it is preferred to place each component in a separate receptacle and apply such heat to each as would be required to vaporize the components in the desired ratio or at least one gram per day for each 15,000 cu. ft. of area.

In order to illustrate the synergistic effect of the components of the present toxicant combination, the following data are presented on representative combinations. These test data were obtained in a test procedure described by Hoskins and Caldwell in "Soap and Sanitary Chemicals," April 1947, page 43. The flies used in these tests were a colony of resistant flies of the Super Pollard, or Metcalf, strain which have developed marked resistance to all chlorinated insecticides, including DDT and lindane. The compositions under test contained varying proportions of the subject toxicant combination in a carrier composed of 50% by volume of acetone and 50% by volume of kerosene.

| Concentration, percent | | Percent Mortality, Resistant Flies |
|---|---|---|
| Lindane | Triethyl-phosphate | |
| 0.1 | | 8 |
| 0.2 | | 27 |
| 0.5 | | 49 |
| | 1.0 | 4 |
| | 2.0 | 5 |
| 0.1 | 0.1 | 20 |
| 0.2 | 2.0 | 76 |
| 0.5 | 1.0 | 96 |
| | Tri(chloro-ethyl) phosphate | |
| | 1.0 | 7 |
| 0.5 | 1.0 | 98 |

On the basis of the foregoing data, it was determined that in the test employing 0.1% of both lindane and triethylphosphate, one pound of triethylphosphate replaces 1.3 pounds of lindane, and on the basis of the test employing 0.5% lindane and 1.0% triethylphosphate, one pound of triethylphosphate replaces 2.8 pounds of lindane. These data are presented merely for illustration and equivalent results may be obtained with other specific toxicant compositions falling within the scope of the subject invention.

It is also possible that other closely related compounds such as diethylchlorophosphate $(C_2H_5O)_2 POCl$, diethyl phosphoric acid and the higher esters of mono and diethyl phosphoric acids will be effective.

Obviously, many modifications and variations of the invention as hereinbefore set forth may be made without departing from the spirit and scope thereof, and only such limitations should be imposed as are indicated in the appended claims.

I claim:

1. An insecticidal composition comprising as an active toxic component a synergistic combination of the gamma isomer of hexachlorocyclohexane and a trialiphatic ester of phosphoric acid, selected from the group consisting of triethylphosphate and tri(chloroethyl) phosphate which are present in a weight ratio of said trialiphatic ester of phosphoric acid to said gamma isomer of hexachlorocyclohexane in the range of from 1 to 10.

2. An insecticidal composition adapted for application as a space spray comprising a solvent diluent and containing as an active toxic component a synergistic combination of the gamma isomer of hexachlorocyclohexane and a trialiphatic ester of phosphoric acid, selected from the group consisting of triethylphosphate and tri(chloroethyl) phosphate which are present in a weight ratio of said trialiphatic ester of phosphoric acid to said gamma isomer of hexachlorocyclohexane in the range of from 1 to 10.

3. An insecticidal composition comprising as an active toxic component a synergistic combination of the gamma isomer of hexachlorocyclohexane and triethylphosphate which are present in a weight ratio of said triethylphosphate to said gamma isomer of hexachlorocyclohexane in the range of from 1 to 10.

4. An insecticidal composition comprising as an active toxic component a synergistic combination of the gamma isomer of hexachlorocyclohexane and tri(chloroethyl) phosphate which are present in a weight ratio of said tri(chloroethyl) phosphate to said gamma isomer of hexachlorocyclohexane in the range of from 1 to 10.

References Cited in the file of this patent

UNITED STATES PATENTS

| Number | Name | Date |
|---|---|---|
| 2,143,639 | Caprio | Jan. 10, 1939 |
| 2,499,396 | Lynn | Mar. 7, 1950 |

FOREIGN PATENTS

| Number | Country | Date |
|---|---|---|
| 126,959 | Australia | Feb. 25, 1948 |